United States Patent Office 3,055,872
Patented Sept. 25, 1962

3,055,872
RESINOUS REACTION PRODUCTS OF POLYUNSATURATED ALLYL ESTERS OF ORGANIC CARBOXYLIC ACIDS AND A SULFUR CHLORIDE
John L. Lang, Midland, Mich., assignor to The Dow Chemical Company, Midland, Mich., a corporation of Delaware
No Drawing. Filed Oct. 13, 1959, Ser. No. 846,064
10 Claims. (Cl. 260—78.4)

This invention relates to new copolymers and to processes for preparing the same. More particularly it relates to such products prepared from allyl esters of organic acids together with sulfur halides.

This application is a continuation-in-part of U.S. Serial No. 614,052, filed October 5, 1956.

It is the principal object of this invention to provide a new class of copolymers composed of certain allyl esters of organic acids together with sulfur halides.

It is a further object to provide a process for preparing such copolymers.

Other objects will become apparent as the description proceeds.

It has now been found that new and useful copolymers may be prepared by subjecting a monomeric material consisting essentially of a sulfur halide and poly unsaturated allyl esters of organic acids to polymerization conditions.

The esters useful in this invention are those having at least two olefinically unsaturated groupings of which at least one is an allyl group. Included within the scope of the invention are the monoallyl esters of monocarboxylic acids, such as the acrylic acids, the diallyl esters of dicarboxylic acids, such adipic and terephthalic acid, and the triallyl esters of tribasic acids such as cyanuric acid. When monoolefinically unsaturated esters are used, no polymeric products are obtained.

The useful sulfur halides are those which are capable of reaction with an olefinically unsaturated compound. Typical examples of such halides are sulfur monochloride ($S_2Cl_2$) and sulfur dichloride ($SCl_2$). Usually the compounds as available commercially will contain small but significant amounts of one of the other halides and these mixtures are equally operable to secure the advantages of the invention. The oxygen compounds such as sulfuryl chloride and thionyl chloride do not provide the polymers contemplated in the instant invention.

The polymerizations may be carried out by bulk or solution polymerization procedures, the techniques of which are well known. When solution polymerization methods are employed, any inert solvent, such as toluene, may be used. The choice of solvent will be determined by economic and hazardous considerations, volatility, and other known or easily obtainable properties.

The process is carried out by adding the sulfur halide to the ester alone or in solution, preferably with agitation. When both polymerizable components are added initially, the reaction is difficult to control and the properties of the products are not reproducible.

These reactions are exothermic and have no appreciable induction period as is noticed in many polymerization reactions. It is preferred to conduct the reaction at a temperature less than about 40° C. Although polymeric products may be obtained by using higher temperatures, the low temperatures favor better control of the reaction.

The molar ratio of monomeric reactants within which useful polymeric products are obtained is substantially stoichiometric. When substantially less than one mole of sulfur halide per mole of ester is used, polymeric products are sometimes obtainable but usually of low molecular weight or in poor yields and with properties principally of the ester homopolymer. When more than two moles of sulfur halide per mole of ester is used, the sulfur halide in excess is wasted.

The copolymer products of this invention may be prepared in a wide variety of properties and capable of diversified utility. The products range from moldable materials to cross-linked infusible materials. Products may also be prepared ranging from readily soluble to insoluble in common organic solvents. The products are capable of being molded into articles, extruded into fibers and filaments, and cast from solution into films and foils.

The advantages and beneficial results derivable from the present invention will be more apparent from the following illustrative examples wherein all parts and percentages are by weight.

*Example 1*

Into a vessel containing 22.6 parts of diallyl adipate there was added portionwise with stirring and cooling 11.2 parts of a mixture of sulfur chlorides having a specific gravity of 1.640 at 15° C. and believed to be composed of about 71 percent sulfur dichloride and 29 percent sulfur monochloride. The temperature was maintained below 50° C. throughout the reaction to minimize any free radical polymerization. As the addition of the sulfur chloride mixture proceeded, the reaction mixture became increasingly viscous. When the stoichiometric equivalent amount of the sulfur chloride mixture is approached (as indicated by the expressed proportions) the product is a straw yellow, very viscous, resinous material.

When suitable free radical polymerization inhibitors are employed the same product can be obtained by using temperatures somewhat above 50° C.

*Example 2*

The procedure of Example 1 was repeated using 11.2 parts of allyl acrylate in place of the diallyl adipate. In this reaction there appeared to be a reduced tendency toward free-radical polymerization. The resulting product was a yellow, very viscous, polymeric material.

*Example 3*

Triallyl cyanurate, 13.9 parts, was dissolved in 40 parts of dry benzene and to this was added portionwise 7.6 parts of the sulfur chloride mixture defined in Example 1. After 7.3 parts of the sulfur chloride mixture had been added the rate of stirring was increased and then the remainder added slowly. A suspension of tiny gels resulted.

When the solvent was omitted the reaction was so rapid that the product was a rigid gel.

When the reaction was repeated using amounts of the sulfur chloride mixture up to 11.31 parts (stoichiometric amount needed for all bonds) the resulting products were of varying degree of cross linking.

*Example 4*

The procedure of Example 1 was repeated using 24.6 parts of diallyl ortho-phthalate in place of the diallyl adipate. It was found that in the absence of suitable inhibitors the temperature had to be kept below 40° C. if free radical polymerization was to be prevented. When the temperature was maintained below 40° C. the product was a light yellow, resinous polymeric solid.

When substantially pure sulfur monochloride or sulfur dichloride is substituted in equivalent amount for the mixture in any of the above examples, similar polymeric products result. In all cases the sulfur halide had to be added extremely slowly if light colored products were to be obtained. When the addition was carried out under conditions so that an excessive temperature occurred the products were usually dark colored.

What is claimed is:

1. As a new copolymeric material the polymerization product of one molar equivalent of an allyl ester of an organic carboxylic acid, said ester having at least two ethylenically unsaturated carbon to carbon linkages, with from one to two molar equivalents of a sulfur halide selected from the group consisting of sulfur monochloride, sulfur dichloride, and mixtures thereof.

2. As a new copolymeric material the polymerization product of one molar equivalent of allyl acrylate with from one to two molar equivalents of a sulfur halide selected from the group consisting of sulfur monochloride, sulfur dichloride, and mixtures thereof.

3. As a new copolymeric material the polymerization product of one molar equivalent of a diallyl ester of a dicarboxylic acid with from one to two molar equivalents of a sulfur halide selected from the group consisting of sulfur monochloride, sulfur dichloride, and mixtures thereof.

4. The copolymeric material claimed in claim 3, wherein said diallyl ester is diallyl adipate.

5. The copolymeric material claimed in claim 3, wherein said diallyl ester is diallyl terephthalate.

6. As a new copolymeric material the polymerization product of one molar equivalent of an allyl ester of an organic carboxylic acid, said ester having at least two ethylenically unsaturated carbon to carbon linkages, with from one to two molar equivalents of a sulfur monochloride capable of reacting with an olefinically unsaturated compound.

7. As a new copolymeric material the polymerization product of one molar equivalent of an allyl ester of an organic carboxylic acid, said ester having at least two ethylenically unsaturated carbon to carbon linkages, with from one to two molar equivalents of a sulfur dichloride capable of reacting with an olefinically unsaturated compound.

8. As a new copolymeric material the polymerization product of one molar equivalent of an allyl ester of an organic carboxylic acid, said ester having at least two ethylenically unsaturated carbon to carbon linkages, with from one to two molar equivalents of a mixture of sulfur monochloride and sulfur dichloride capable of reacting with the olefinically unsaturated compound.

9. As a new copolymeric material the polymerization product of one molar equivalent of triallyl cyanurate with from one to two molar equivalents of a sulfur halide selected from the group consisting of sulfur monochloride, sulfur dichloride, and mixtures thereof.

10. The process for preparing copolymeric products comprising the slow addition of from one to two molar equivalents of a sulfur halide selected from the group consisting of sulfur monochloride, sulfur dichloride, and mixtures thereof to one molar equivalent of an allyl ester of an organic carboxylic acid, said ester having at least two unsaturated carbon to carbon linkages at a temperature of less than about 40° C. and allowing the reaction to proceed to completion.

References Cited in the file of this patent

UNITED STATES PATENTS

| 1,535,740 | Snelling | Apr. 28, 1925 |
| 2,426,994 | Frosch | Sept. 9, 1947 |
| 2,454,862 | Collins | Nov. 30, 1948 |